(12) United States Patent
Markman

(10) Patent No.: US 6,744,474 B2
(45) Date of Patent: Jun. 1, 2004

(54) RECURSIVE METRIC FOR NTSC INTERFERENCE REJECTION IN THE ATSC-HDTV TRELLIS DECODER

(75) Inventor: Ivonete Markman, Carmel, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 483 days.

(21) Appl. No.: 09/955,883

(22) Filed: Sep. 19, 2001

(65) Prior Publication Data
US 2002/0036714 A1 Mar. 28, 2002

Related U.S. Application Data
(60) Provisional application No. 60/255,163, filed on Dec. 13, 2000.

(51) Int. Cl.[7] .................................................. H04N 5/21
(52) U.S. Cl. .................... 348/607; 348/470; 375/346; 375/348
(58) Field of Search ................. 348/21, 608, 614, 348/470, 607; 375/265, 350, 348, 341, 346

(56) References Cited

U.S. PATENT DOCUMENTS

5,325,188 A * 6/1994 Scarpa ..................... 348/624
5,969,751 A * 10/1999 Lee ............................. 348/21
6,449,002 B1 * 9/2002 Markman et al. ........... 348/21

* cited by examiner

Primary Examiner—Victor R. Kostak
(74) Attorney, Agent, or Firm—Joseph S. Tripoli; Joseph J. Laks; Ronald H. Kurdyla

(57) ABSTRACT

In a system for receiving a signal containing digital data representing HDTV image information in the form of multilevel symbols formatted into groups of successive fields, each field comprising a field segment, a plurality of data segments, and associated sync components, the received signal is demodulated to produce a demodulated signal. The demodulated signal is comb-filtered to reject NTSC co-channel interference to produce a filtered signal. The filtered signal is trellis decoded with a trellis decoder employing a recursive non-Euclidean metric.

13 Claims, 9 Drawing Sheets

D = 1 symbol delay for each of the 12 decoders

D = 1 symbol delay for each of the 12 decoders

Fig. 6    600

Curve 603: 4state-euclid
Curve 602: 8state-euclid
Curve 601: 8state-recurs

Curve 702: 4state-euclid
Curve 701: 8state-recurs1

Curve 803: 4st-abs-euclid
Curve 802: 8st-abs-euclid
Curve 801: 8st-abs-recurs1

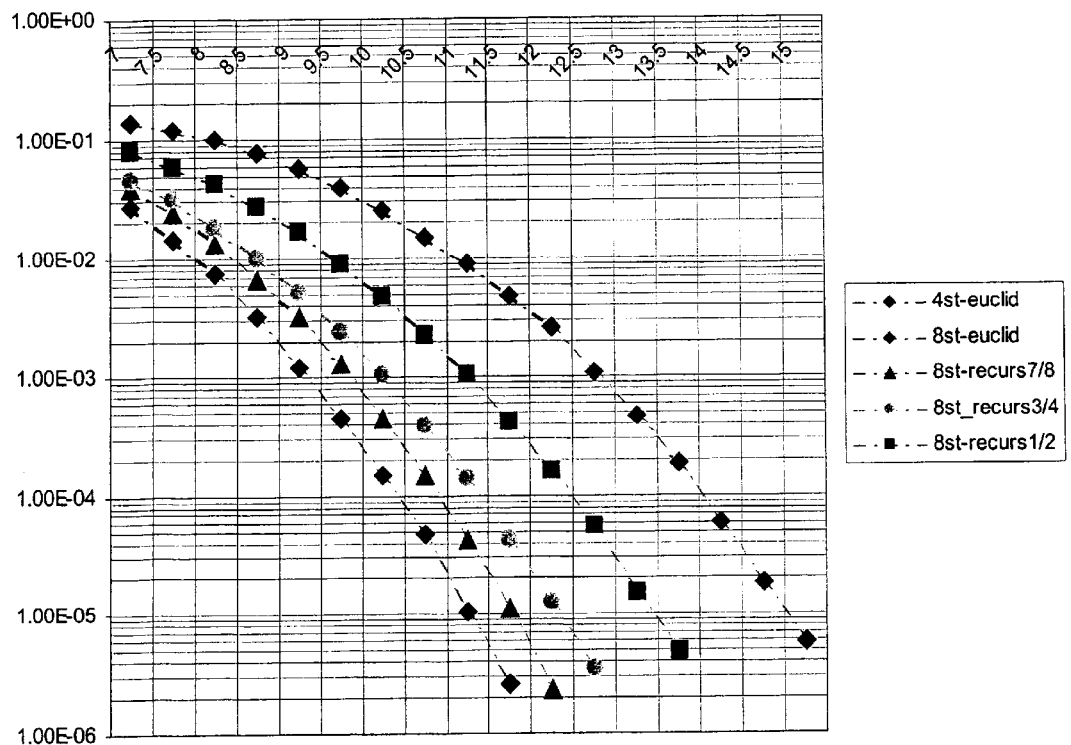
Fig. 9    900
Curve 905: 4st-euclid
Curve 904: 8st-euclid
Curve 903: 8st-recurs7/8
Curve 902: 8st-recurs3/4
Curve 901: 8st-recurs1/2

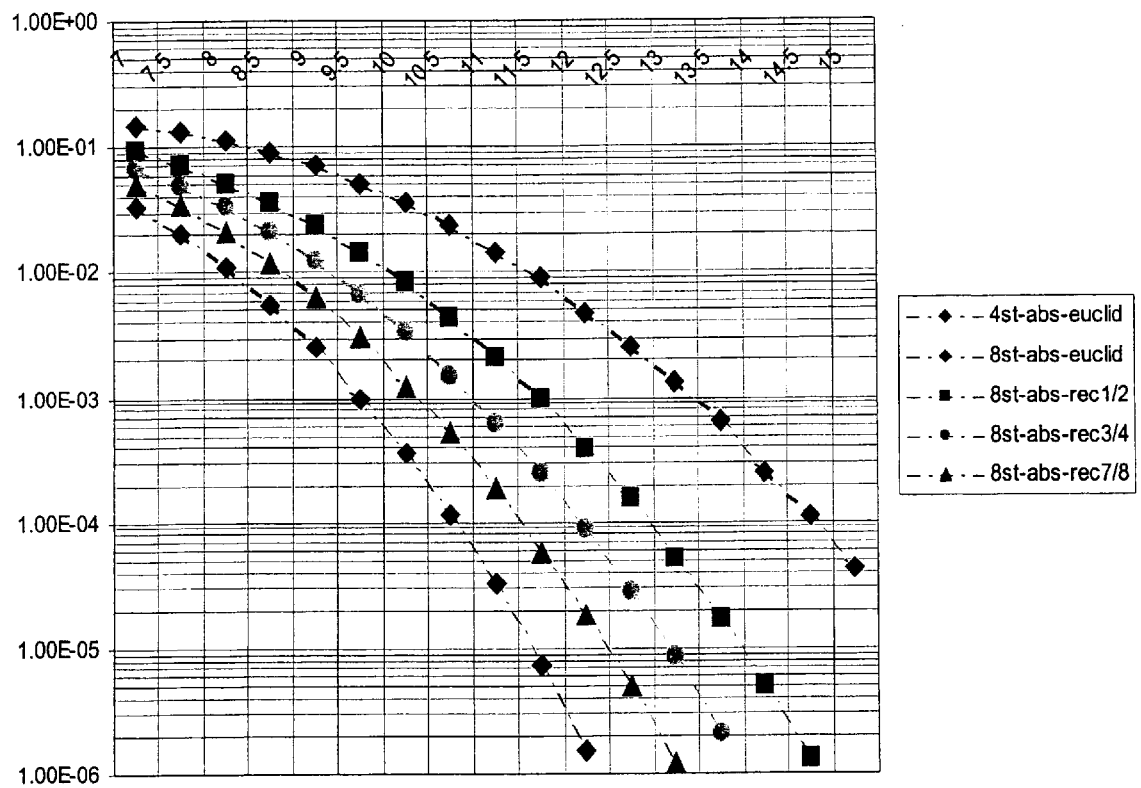
Fig. 10    1000
Curve 1005: 4st-abs-euclid
Curve 1004: 8st-abs-euclid
Curve 1003: 8st-abs-rec1/2
Curve 1002: 8st-abs-rec3/4
Curve 1001: 8st-abs-rec7/8

RECURSIVE METRIC FOR NTSC INTERFERENCE REJECTION IN THE ATSC-HDTV TRELLIS DECODER

CROSS-REFERENCES TO RELATED APPLICATIONS

This nonprovisional U.S. national application claims the benefit of the filing date of provisional U.S. national application No. 60/255,163, filed on Dec. 13, 2000 for Recursive Metric for NTSC Interference Rejection in the ATSC-HDTV Trellis Decoder, the entirety of which is incorporated herein by reference.

BACKGROUND OF THE INVENTION

1. Field of the Invention

The present invention relates to video signal receivers which receive high definition television (HDTV) signals and, in particular, to employing a trellis decoder to decode a received VSB-modulated HDTV signal after it has been demodulated and comb-filtered to reject NTSC co-channel interference.

2. Background

In data transmission systems, data, such as audio and video television (TV) data, is transmitted to a plurality of receivers. In the field of television signal transmission systems, the current NTSC (National Television Systems Committee) standard of transmission is being replaced by a higher-quality system, known as HDTV, or the ATSC-HDTV standard (see United States Advanced Television Systems Committee, ATSC Digital Television Standard, Document A/53, Sep. 16, 1995). Such HDTV signals are of the VSB-modulated (Vestigial SideBand) type proposed by the Grand Alliance in the United States.

The ATSC-HDTV standard requires an 8-VSB modulated transmission system which includes forward error correction (FEC) as a means of improving system performance. Referring now to FIG. 1, there is shown a simplified block diagram of the forward error correcting (FEC) aspects of a HDTV transmission system 100. System 100 contains a Reed-Solomon encoder 103, followed by a byte interleaver 104, and a trellis encoder 105 on the transmitter side 101. At the receiver end 121 there is a corresponding trellis decoder 125, byte deinterleaver 124, and Reed-Solomon decoder 123.

In such a system, data signals are first encoded in accordance with a given code or encoding scheme, such as a convolutional, or trellis, code, by trellis encoder 105. The trellis code employed is a rate 2/3 TCM (trellis coded modulation) code, as described in the ATSC Digital Television Standard. This code is implemented by coding one bit using a rate 1/□, 4-state convolutional encoder, and adding an FEC uncoded bit, which is differentially precoded. Each set of three encoder output bits is then mapped to an 8-VSB modulator symbol by modulator 106, and transmitted over a given communications channel and transmission medium 150. For example, the modulated, encoded HDTV signal may be transmitted as a terrestrial RF signal through the air. The transmitted signal contains digital data representing HDTV image and other information in the form of multi-level symbols formatted into groups of successive fields, each field comprising a field segment, a plurality of data segments, and associated sync components.

The HDTV receiver 121 receives the transmitted signals. Demodulator 126 is used to demodulate the signal to provide a demodulated baseband signal; and trellis decoder 125 is used to decode the demodulated signal to obtain the original data.

Due to the fact that NTSC and HDTV signals will coexist in the terrestrial broadcast channel for a number of years, it is important for the receiver 121 to reject possible NTSC co-channel interference. The elimination of NTSC interference may be performed by an NTSC rejection filter, such as a comb filter, added to the demodulator. The comb filter is typically a 12-symbol one-tapped delay line with signal attenuating nulls at or near the NTSC carriers.

Thus, when the HDTV receiver detects NTSC co-channel interference, it filters the demodulated signal to remove the NTSC co-channel interference that would otherwise arise, before performing trellis decoding. In the non-NTSC interference case, to avoid unnecessary filtering and undesirable effects of such filtering, the comb filter is not applied.

When no NTSC interference is detected, the optimal trellis decoder for the AWGN (Additive White Gaussian Noise) channel is a 4-state Viterbi decoder with the Euclidean metric. See G. Ungerboeck, Channel Coding with Multilevel/Phase Signals, *IEEE Trans. Inform. Theory*, vol. IT-28, pp. 55–67, January 1982. Thus, in performing the decoding, the trellis decoder 125 typically employs an Euclidean metric, which can provide optimal decoding when there is no NTSC interference. However, when NTSC interference is present, the use of the NTSC rejection (comb) filter introduces correlation in the noise (Additive Colored Gaussian Noise), such that the optimal trellis decoder is much more complex. Therefore, an optimal trellis decoder is typically used where there is no NTSC co-channel interference, and a partial response trellis decoder is used whenever the NTSC rejection filtering is employed.

Such systems employ 12 intra-segment interleaving (deinterleaving) in the trellis encoding (decoding), in which 12 identical encoders (decoders) are used. This permits implementing the trellis decoder 202 in the NTSC interference case as an 8-state (partial response) trellis decoder, and as a 4-state (optimal) trellis decoder 203 in the non-NTSC interference case. By employing the 12 encoder/decoder interleaving, each of the identical decoders of the trellis decoder for the NTSC interference case views the comb filter with a 1-symbol delay (instead of 12). The advantage of this architecture is that the optimal trellis decoder can be implemented with an 8-state Viterbi decoder. See United States Advanced Television Systems Committee, Guide to the Use of the ATSC Digital Television Standard, Document A/54, Oct. 4, 1995.

Referring now to FIG. 2, there is shown a block diagram illustrating the HDTV trellis decoding performed by receiver 121 of system 100 of FIG. 1, with and without NTSC interference, for each of 12 sequential decoders of trellis decoder 125. Symbol-level signal data is received from demodulator 126 (FIG. 1). In a first (NTSC interference) path, the demodulated signal is filtered by NTSC rejection (comb) filter 201, and this filtered, demodulated signal is decoded by partial response 8-state trellis decoder 202. The 8-state decoder 202 receives at its input a partial-response signal plus noise, because it is comb-filtered. This partial-response signal, which is derived from 8-VSB symbols, is also known as 15-VSB since it has 15 amplitude levels. In a second (non-NTSC interference) path, the demodulated signal is not filtered, and is decoded by optimal 4-state trellis decoder 203. Switch 204 selects the appropriate decoded signal depending on whether NTSC interference is detected.

As will be appreciated, there may be only a single trellis decoder 125 which is used to implement both 8-state trellis decoder 202 and 4-state trellis decoder 203, depending on whether demodulator 126 detects NTSC interference or not. Or, trellis decoder 125 may include separate decoders 202, 203, one of which is selected depending on whether NTSC interference is detected. Further, comb filter 201 is included in demodulator 126. It is selected, or applied, by demodulator 126 when it detects NTSC interference. Thus, when demodulator 126 detects NTSC interference, it outputs a comb filtered, demodulated signal to decoder 125, and also instructs decoder 125 that NTSC interference has been detected so that decoder 125 can use the 8-state trellis decoder 202. Conversely, when demodulator 126 does not detect NTSC interference, it outputs a non-comb filtered, demodulated signal to decoder 125, and does not instruct decoder 125 that NTSC interference has been detected, so that decoder 125 can use the 4-state trellis decoder 203. This functionality is illustrated in the process flow of FIG. 2.

Both the optimal 4-state trellis decoder 203, and partial response 8-state trellis decoder 202, employ the Euclidean metric or some variation of it in current implementations. In the non-NTSC interference case of decoder 204, this results in an optimal trellis decoder and optimal results, as described above. However, the 8-state trellis decoder 202 with the Euclidean metric has a performance degradation of about 3.0 to 3.75 dB with respect to the non-NTSC interference case. A suboptimal truncated non-Euclidean trellis decoder metric with better performance than the Euclidean metric is described in a copending U.S. patent application Ser. No. 09/603,655 filed Jun. 26, 2000 for Markman et al. Particularly, its two simplest implementations give 1.0 and 1.5 dB improvement over the Euclidean metric.

SUMMARY OF THE INVENTION

A signal processing method according to the present invention is included in a system for receiving a trellis coded signal containing digital data. A received signal is demodulated to produce a signal that can be trellis decoded using a Euclidean metric. The demodulated signal is subjected to filtering which produces an output with correlated noise. The filtered signal is trellis decoded using a recursive non-Euclidean metric.

BRIEF DESCRIPTION OF THE DRAWINGS

FIG. 9 is a graph plotting BER vs. $E_b/N_0$ curves to illustrate the performance of the recursive-r trellis decoder metric of the present invention; and FIG. 10 is a graph plotting BER vs. $E_b/N_0$ curves to illustrate the performance of the absolute recursive-r trellis decoder metric of the present invention.

DESCRIPTION OF THE PREFERRED EMBODIMENT

Figure 3:
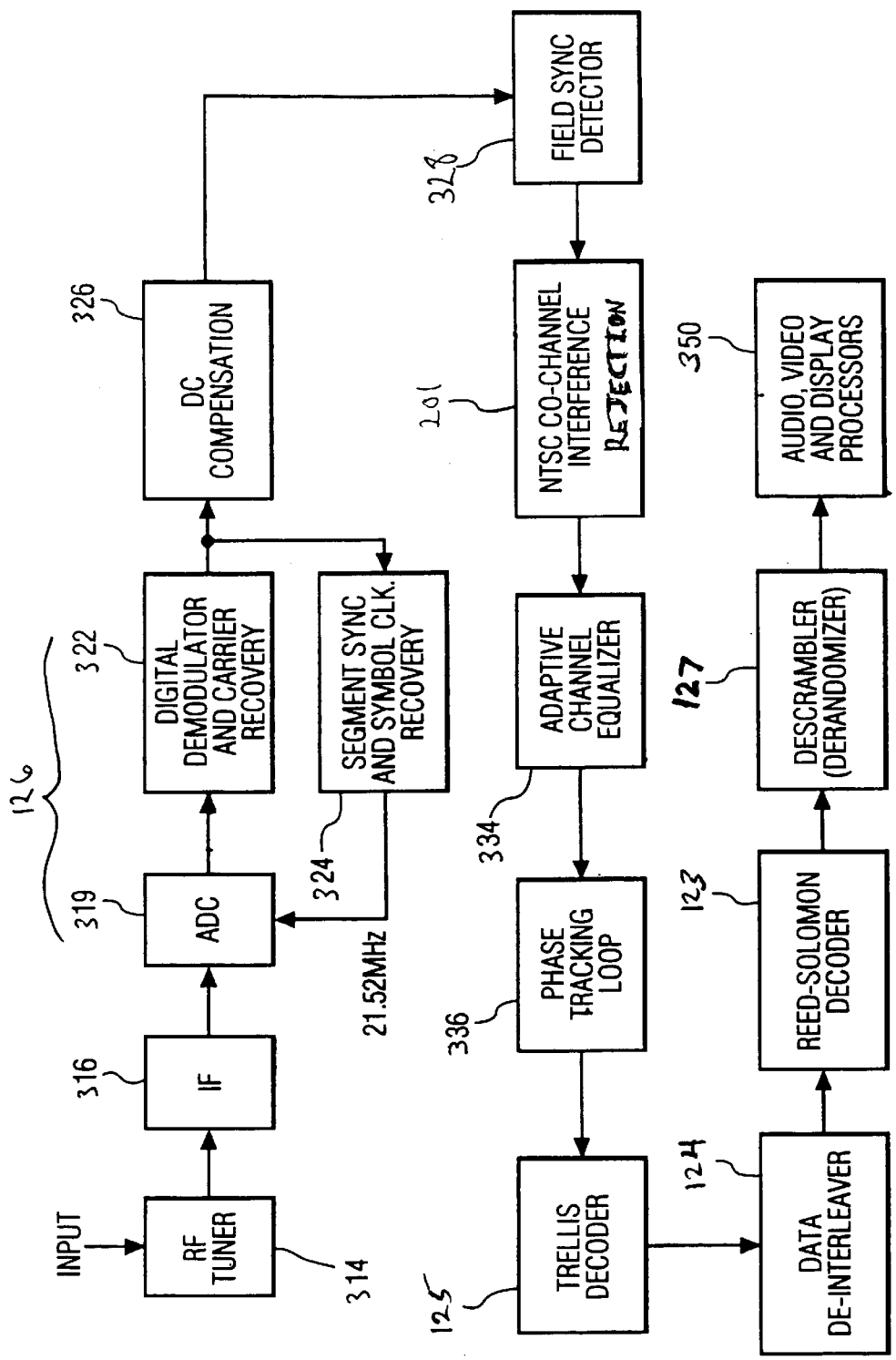
FIG. 3 is a block diagram illustrating the receiver of the system of FIG. 1 in further detail, employing a preferred embodiment of the present invention.

The present invention provides an improved metric for use with the trellis decoder of a HDTV receiver in accordance with the ATSC terrestrial broadcast standard adopted in the U.S. In particular, the present invention provides for the use of a recursive non-Euclidean family of optimal and suboptimal trellis decoder metrics when the received HDTV signal is processed by a comb filter to remove NTSC co-channel interference. As described in further detail below, the disclosed recursive metric has better performance than the Euclidean metric, in the case of NTSC interference and the consequent use of a comb filter. In addition, the recursive family of metrics also provides better performance than the truncated metric described in the copending US application of Markman et al. noted earlier.
TSC-HDTV Receiver and Trellis Decoding Referring now to FIG. 3, there is shown a block diagram illustrating receiver 121 of system 100 in further detail, according to a preferred embodiment of the present invention. Using HDTV receiver 121, a terrestrial broadcast analog input HDTV signal is processed by an input network 314 including RF tuning circuits and an intermediate frequency (IF) processor 316 including a double conversion tuner for producing an IF passband output signal, and appropriate automatic gain control (AGC) circuits. The received signal is a carrier suppressed 8-VSB modulated signal as proposed by the Grand Alliance and adopted for use in the United States. Such a VSB signal is represented by a one-dimensional data symbol constellation wherein only one axis contains quantized data to be recovered by the receiver. For simplicity of illustration, signals for clocking the illustrated functional blocks are not shown in FIG. 3.

The recovery of data from modulated signals conveying digital information in symbol form usually requires three functions at a receiver: timing recovery for symbol synchronization, carrier recovery (frequency demodulation to baseband), and channel equalization. Timing recovery is a process by which a receiver clock (timebase) is synchronized to a transmitter clock. This permits a received signal to be sampled at optimum points in time to reduce slicing errors associated with decision-directed processing of received symbol values. Carrier recovery is a process by which a received RF signal, after being frequency down converted to a lower intermediate frequency passband (e.g., near baseband), is frequency shifted to baseband to permit recovery of the modulating baseband information. Adaptive channel equalization is a process by which the effects of changing conditions and disturbances in the signal transmission channel are compensated for. This process typically employs filters that remove amplitude and phase distortions resulting from frequency dependent time variant characteristics of the transmission channel, to provide improved symbol decision capability.

Figure 4:
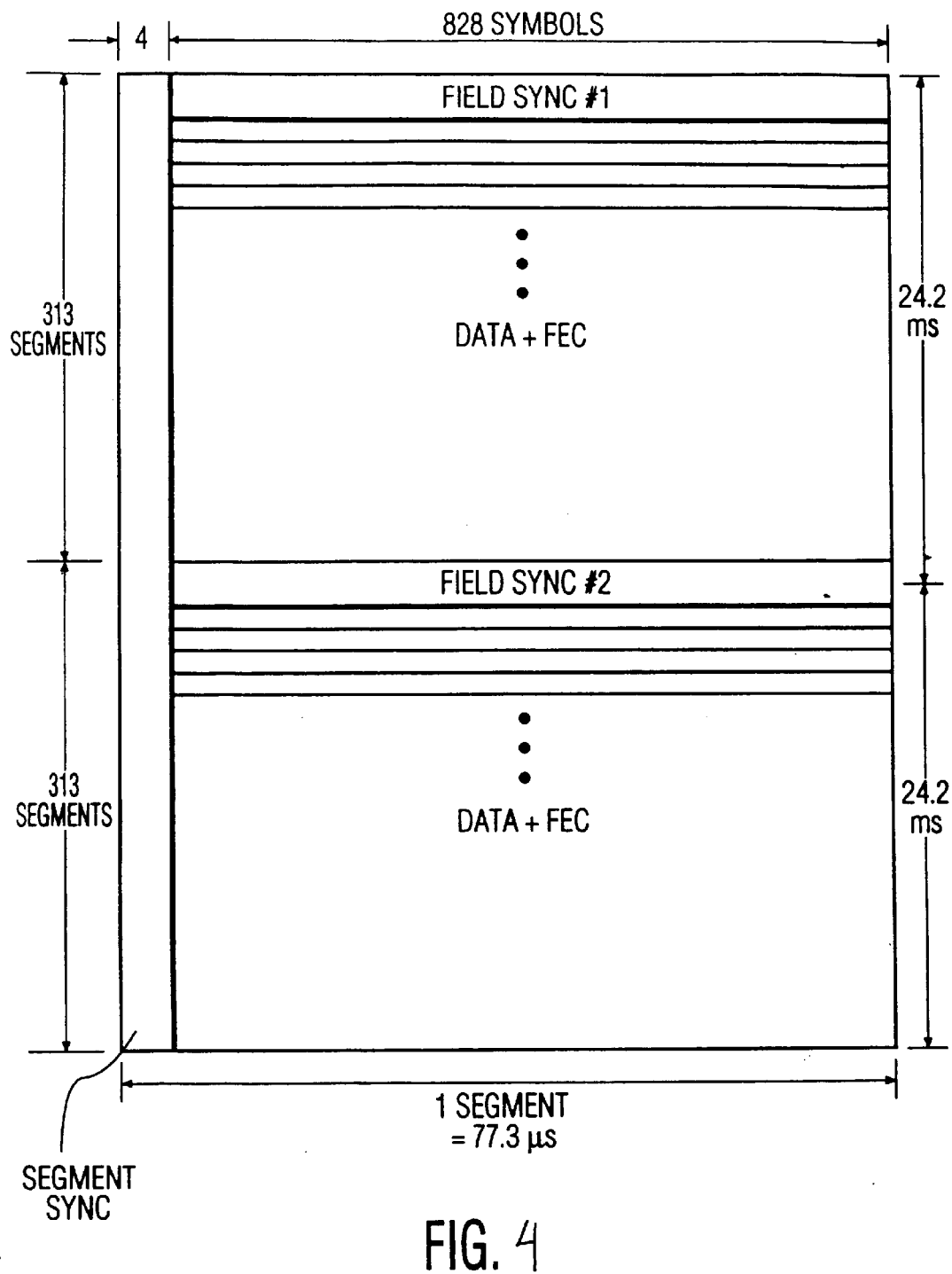
FIG. 4 depicts a data frame format for a VSB modulated signal according to the Grand Alliance HDTV system in the United States.

As described in the Grand Alliance HDTV System Specification dated Apr. 14, 1994, the VSB transmission system conveys data with a prescribed data frame format as shown in FIG. 4. Referring now to FIG. 4, there is depicted a data frame format for a VSB modulated signal according to the Grand Alliance HDTV system in the United States. A small pilot signal at the suppressed carrier frequency is added to the transmitted signal to help achieve carrier lock at a VSB receiver. As shown in FIG. 4, each data frame comprises two fields with each field including 313 segments of 832 multilevel symbols. The first segment of each field is referred to as a field sync segment, and the remaining 312 segments are referred to as data segments. The data segments typically contain MPEG-compatible data packets. (E.g., International Standards Organization (ISO) ISO/IEC 11172 Moving Pictures Experts Group-1 standard (MPEG-1); or the ISO/IEC 13818 (MPEG-2) standard.) Each data segment comprises a four-symbol segment sync character followed by 828 data symbols. Each field segment includes a four-symbol segment sync character followed by a field sync component comprising a predetermined 511 symbol pseudorandom number (PN) sequence and three predetermined 63-symbol PN sequences, the middle one of which is inverted in successive fields. A VSB mode control signal (defining the VSB symbol constellation size) follows the last 63-symbol PN sequence, which is followed by 96 reserved symbols and 12 symbols copied from the previous field.

Referring once more to FIG. 3, the passband IF output signal from IF unit 316 is converted to an oversampled digital symbol datastream by an analog-to-digital converter (ADC) 319. The output oversampled digital datastream from ADC 319 is demodulated to baseband by an all digital demodulator/carrier recovery network 322. This is done by an all digital phase locked loop (PLL) in response to the small reference pilot carrier in the received VSB datastream. Unit 322 produces an output I-phase demodulated symbol datastream, as will be appreciated by those skilled in the art.

ADC 319 oversamples the input 10.76 MSymbols/sec VSB symbol datastream with a 21.52 MHz sampling clock, i.e., twice the received symbol rate, thereby providing an oversampled 21.52 MSamples/sec datastream with two samples per symbol. The use of such two sample per symbol sample based processing, rather than symbol-by-symbol (one sample per symbol) symbol based processing, produces advantageous operation of subsequent signal processing functions such as are associated with DC compensation unit 326 and the NTSC interference detector of demodulator 126, for example.

Associated with ADC 19 and demodulator 22 is a segment sync and symbol clock recovery network 324. Network 24 detects and separates the repetitive data segment sync components of each data frame from the random data. The segment syncs are used to regenerate a properly phased 21.52 MHz clock which is used to control the datastream symbol sampling by ADC 319. As will be appreciated, network 324 advantageously uses an abbreviated two-symbol correlation reference pattern and associated two-symbol data correlator to detect the segment sync.

A DC compensation unit 326 uses an adaptive tracking circuit to remove from the demodulated VSB signal a DC offset component to the pilot signal component. Unit 28 detects the data field sync component by comparing every received data segment with an ideal field reference signal stored in memory in the receiver. In addition to field synchronization, the field sync signal provides a training signal for channel equalizer 334.

NTSC interference detection and rejection are performed by unit 201 of demodulator 126. Afterwards, the signal is adaptively equalized by channel equalizer which may operate in a combination of blind, training, and decision-directed modes. Equalizer 334 may be of the type described in the Grand Alliance HDTV System Specification and in an article by W. Bretl et al., □VSB Modem Subsystem Design for Grand Alliance Digital Television Receivers, *IEEE Trans. Consumer Electronics,* August 1995. The output datastream from comb filter 201 is downconverted to a one sample/symbol (10.76 MSymbols/sec) datastream prior to equalizer 334. This downconversion may be accomplished by a suitable downsampling network (not shown to simplify the drawing).

Figure 1:
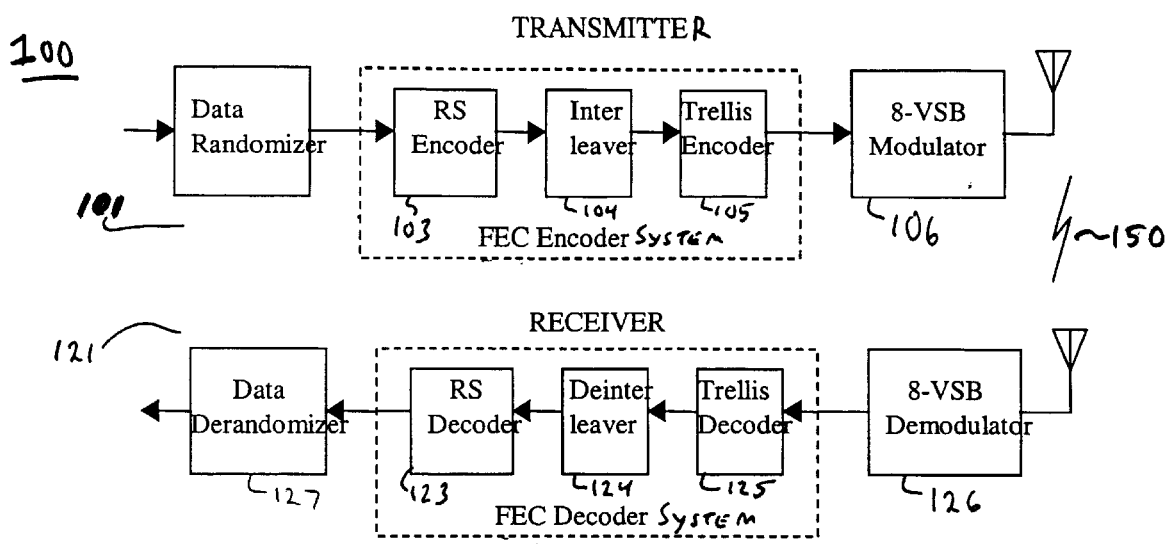
FIG. 1 is a simplified block diagram of the FEC aspects of a HDTV transmission system.

Equalizer 334 corrects channel distortions, but phase noise randomly rotates the symbol constellation. Phase tracking network 336 removes the residual phase and gain noise in the output signal from equalizer 334, including phase noise which has not been removed by the preceding carrier recovery network in response to the pilot signal. All of the components shown in FIG. 3 before trellis decoder 125, namely units 314, 316, 319, 322, 324, 326, 328, 201, 334, and 336, are represented by the demodulator block 126 of FIG. 1.

The phase corrected signal output by phase tracking network 336 of demodulator 126 is then trellis decoded by unit 125, de-interleaved by unit 124, Reed-Solomon error corrected by unit 123, and descrambled (de-randomized) by unit 127. Afterwards, a decoded datastream is subjected to audio, video, and display processing by unit 350.

Tuner 314, IF processor 316, field sync detector 328, equalizer 334, PLL 336, trellis decoder 125, de-interleaver 124, Reed-Solomon decoder 123, and descrambler 127 may employ circuits of the type described in the Grand Alliance HDTV System Specification of Apr. 4, 1994, and in the Bretl et al. article mentioned above. Circuits suitable for performing the functions of units 319 and 350 are well known.

Demodulation in unit 322 is performed by an all digital automatic phase control (APC) loop to achieve carrier recovery. The PLL uses the pilot component as a reference for initial acquisition and a normal phase detector for phase acquisition. The pilot signal is embedded in the received datastream, which contains data exhibiting a random, noise-like pattern. The random data is essentially disregarded by the filtering action of the demodulator APC loop. The 10.76 MSymbols/sec input signal to ADC 319 is a near baseband signal with the center of the VSB frequency spectrum at 5.38 MHz and the pilot component situated at 2.69 MHz. The input datastream is advantageously two-times oversampled by ADC 319 at 21.52 MHz. In the demodulated datastream from unit 322 the pilot component has been frequency shifted down to DC.

Figure 2:
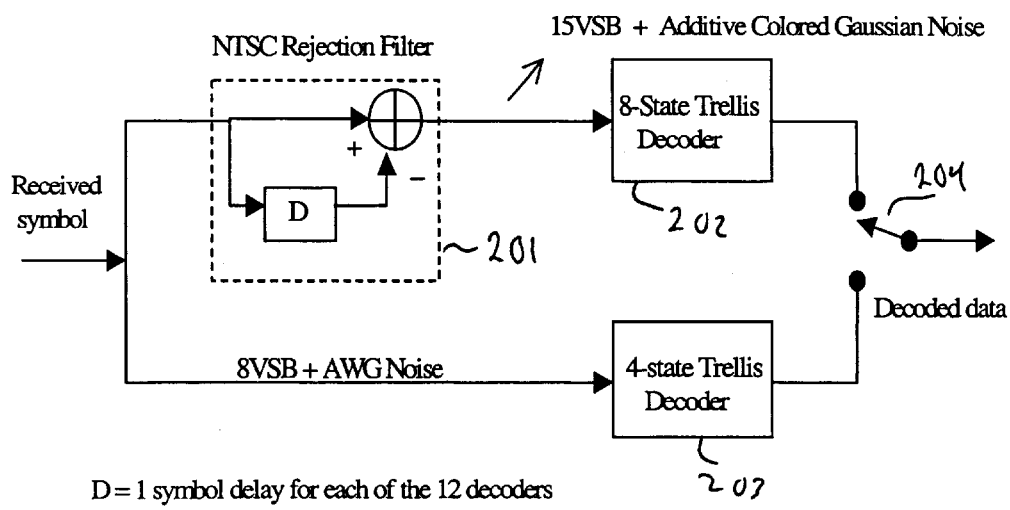
FIG. 2 is block diagram illustrating the HDTV trellis decoding performed by the receiver of the system of FIG. 1, with and without NTSC interference, for each of 12 sequential decoders of the trellis decoder.

In an embodiment, demodulator 126 performs demodulation with digital demodulation unit 322 and, when it detects NTSC co-channel interference, it activates comb filter 201 to perform NTSC co-channel interference rejection; otherwise, comb filter 201 is inactive and does not filter the signal. As explained above with reference to FIG. 2, trellis decoder unit 125 can implement both the optimal 4-state trellis decoder 203 used in the non-NTSC interference case, and the partial response 8-state trellis decoder 202 used in the NTSC interference case. The optimal trellis decoder 203 of trellis decoder 125 employs an Euclidean metric, and the partial response trellis decoder 202 of trellis decoder 125 employs a recursive, non-Euclidean family of optimal and suboptimal metrics in accordance with the present invention, as described in further detail below.

Optimal Non-Euclidean Metric for NTSC Interference Case

The present invention provides for a family of metrics, referred to herein as a recursive metric, which is more suited than the Euclidean metric for the NTSC interference case.

By configuring partial response trellis decoder 202 to employ a recursive metric in accordance with the present invention, it is possible to recover the 3.0 to 3.75 dB loss in performance introduced by the comb filter 201 in the NTSC interference case. The recursive metric has been found to be the optimum metric for this case. In a recursive metric, a current metric term is a function of a previous metric term plus an additional term. Thus there is a recursion on previous terms.

As explained above, in an ATSC-HDTV trellis decoder in accordance with the ATSC-HDTV standard, the Euclidean metric is not optimal when NTSC interference is present, due to the correlated noise introduced when the NTSC rejection filter 201 is applied to reject the detected NTSC co-channel interference, as seen from the following discussion.

Figure 5:
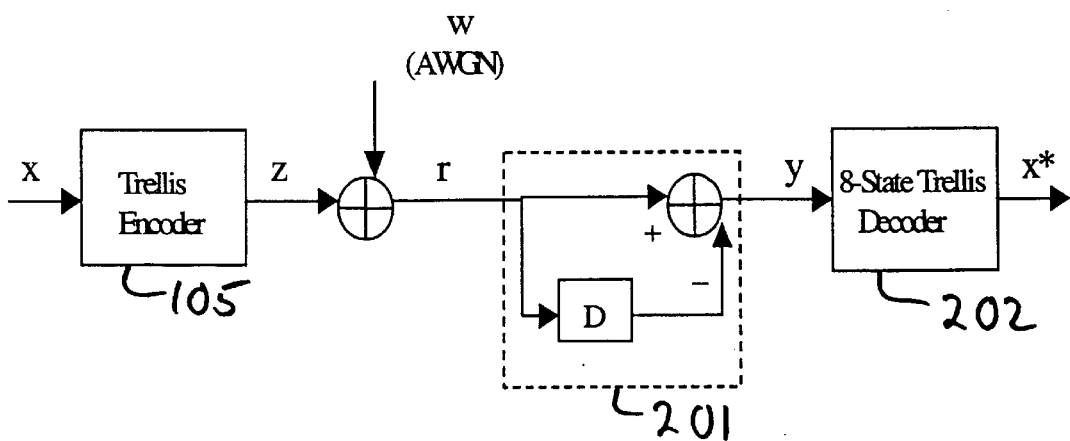
FIG. 5 is a simplified block diagram illustrating an aspect of the HDTV transmission system of FIG. 1 for determining the optimal non-Euclidean metric for the NTSC interference case.

In order to derive the optimum metric of the partial response trellis decoder, it is useful to first analyze the partial response signal. Referring now to FIG. 5, there is shown a simplified block diagram 500 illustrating an aspect of the HDTV transmission system of FIG. 1 for determining the optimal non-Euclidean metric for the NTSC interference case. Illustrated in FIG. 5 are trellis encoder 105 of transmitter 101 of system 100, comb filter 201 of demodulator 126 (FIGS. 1, 2), and the 8-state partial response trellis decoder 202 of decoder 125 (FIGS. 1, 2) which is employed by receiver 121 in the NTSC interference case. In the diagram illustrated in FIG. 5, x is the data input sequence; z is the encoder output sequence, transmitted sequence, or codeword; w is the AWGN noise sequence; r is the received sequence; y is the rejection filter output sequence, and x* is the decoded data sequence. For each sample (or symbol) i, the following relations will hold:

$$r_i = z_i + w_i$$

$$dz_i = z_i - z_{(i-1)}$$

$$dw_i = w_i - w_{(i-1)}$$

$$y_i = r_i - r_{(i-1)} = dz_i + dw_i \quad (1)$$

From Eq. (1), it is seen that the trellis decoder 202 receives at its input a partial response signal $dz_i$ plus noise. This partial response signal derived from 8-VSB symbols is also known as 15-VSB, since it has 15 possible amplitude levels.

The multidimensional Gaussian probability density function (PDF) of the $dw^n$ stochastic sequence of length n is defined as shown in Eq. (2):

$$p_{dw}(dw^n) = p(dw_1)\, p(dw_2/dw_1)\, p(dw_3/dw_2 dw_1) \ldots \quad (2)$$

$$p(dw_n/dw_{n-1} \ldots dw_1)$$

$$= \{1/((2\pi)^{n/2}(det[K_{dw}])^{1/2})\}\mathrm{EXP}\{-[dw^n]^T K_{dw}^{-1} dw^n/2\}$$

where det[.] represents the matrix determinant, $[.]^T$ is the matrix transpose, $K^{-1}$ represents the matrix inverse of K and K is the covariance matrix of the noise sequence $dw^n$ of length n. See Henry Stark & John W. Woods, *Probability, Random Processes, and Estimation Theory for Engineers*, 2nd ed. (Englewood Cliffs, N.J.: Prentice Hall, 1994).

By applying the Maximum Likelihood (ML) decision rule to the PDF in Eq. (2), we derive the optimum metric, given by:

$$\mu^n = [y^n - dz^n]^T K_{dw}^{-1}[y^n - dz^n] \quad (3)$$

Due to the noise correlation introduced by the comb filter in the NTSC interference case, the covariance matrix of the stochastic Gaussian noise sequence is not a scaled version of the identity matrix, as in the case of non-NTSC interference. See the Stark & Woods text referenced above. In addition, the inverse covariance matrix, $K^{-1}$, will be a nxn matrix with non-zero coefficients. Therefore, the optimal metric is not the Euclidean metric, and also increases in complexity as the sequence length n increases. Thus, the optimal metric for the NTSC interference case can be very complex. However, by considering the noise correlation between adjacent samples of the covariance matrix $K^{-1}$, we derived a closed form solution for the optimal metric, given by:

$$\mu^n = \sum_{i=1}^{n} \mu_i = \sum_{i=1}^{n} \left( \sum_{j=0}^{i-1} (1 - j/i) dw_{i-j} \right)^2 \Bigg|_{dw=y-dz} \quad (4)$$

Equation (4) has a repetitive structure, which grows in complexity as $n \to \infty$. Particularly, the number of metric terms dw stored per state, and the number of adders/multipliers per state grow linearly with n. This amounts to unfeasibility, unless some simpler way can be found to generate this metric.

Recursive Non-Euclidean Metric for NTSC Interference Case

In an embodiment, the present invention exploits the relationship between adjacent metric terms and provides a recursive implementation of the optimal metric in Eq. (4), which is employed by trellis decoder 202 during decoding. The optimal recursive metric is given by:

$$\mu^n = \sum_{i=1}^{n} \mu_i = \sum_{i=1}^{n} (rw_i)^2 \quad (5)$$

$$rw_i = dw_i + (i-1) rw_{i-1}/i \big|_{dw=y-dz}$$

where n is the sequence length; y is the received partial response symbol plus correlated noise; dz is the partial response symbol; dw is the correlated noise; $dw_{-m+1} = \ldots = dw_{-1} = dw_0 \equiv 0$ and $rw_0 = 0$. Thus, the family of recursive metrics of an embodiment of the present invention is given by Eq. (5).

The recursive approach in Eq. (5) considerably decreases the complexity in Eq. (4), since now only one term, $rw_{i-1}$, needs to be stored per state, and only one adder/multiplier per state is necessary to generate $rw_i$. The complexity per trellis branch is now bounded, resulting in a feasible implementation of the optimum metric. In equation 5, "$rw_i$" is associated with the current metric term, and $rw_{i-1}$ is associated with the previous term.

Equation 5 defines the recursive metric for a trellis coded sequence of length "n." Each term $\square_i$ is a metric term for symbol time "i" and is a function of $rw_i$. The recursive term $rw_i$ is a function of the previous term $rw_{i-1}$ and another term $dw_i$, which represents the current noise term. The trellis decoder calculates $\square_i$ for every symbol that arrives, and the decoder uses this calculated metric to help it decide what was the most likely transmitted symbol. Thus the decoder attempts to recover the correct transmitted symbol even though it received a noise-corrupted version of it. The metric is the basis of the decoder operation and helps the decoder decide which is the correct transmitted symbol.

As will be appreciated, the implementation of the recursive metric of the present invention by trellis decoder 202 is similar to the implementation of the absolute-Euclidean metric employed in previous HDTV trellis decoders, with proper adjustments for the need to store previous metric terms.

Alternative Recursive Metrics

In addition to the recursive metric of Eq. (5), in alternative embodiments, variations of the recursive metric may also be employed, such as the recursive-one metric, the absolute-recursive-one metric, the recursive-r metric and the absolute-recursive-r metric. These metrics permit easy practical implementations, while keeping most or all of the relative gains achieved by using the embodiment of the recursive metric described above with reference to Eq. (5). These variations of the recursive metric are described below.

Recursive-One Metric

Although Eq. (5) shows a simpler way to implement the optimal metric, it still has an issue of practical nature in the fractional coefficient $(i-1)/i$. However, this coefficient quickly approaches unity as i increases. In an alternative embodiment, a simple practical implementation results from removing the coefficients in Eq. (5), i.e., replacing them with a constant 1. This quasi-optimal simpler embodiment is referred to herein as recursive-one metric, and is given by:

$$\mu^n = \sum_{i=1}^{n} \mu_i = \sum_{i=1}^{n} (rw_i)^2 \quad (6)$$

$$rw_i = dw_i + rw_{i-1}|_{dw=y-dz}$$

where $rw_0 = 0$.

Replacing the coefficient term $(i-1)/i$ with the constant "1" is an approximation which simplifies hardware implementation since as i grows, the term $(i-1)/i$ approaches unity (1).

Absolute Recursive-One Metric

Although the Euclidean metric has a square term, one approximation often made when implementing Viterbi decoders is to define as the metric the absolute value of the term to be squared, whereby the sign of the term is eliminated and only the magnitude of the term is used. This simplifies the size of the metric and the associated hardware, and eliminates the need for a multiplier per state, or a ROM, at the cost of some performance degradation. In an alternative embodiment, a similar absolute value technique is applied to the recursive-one metric of Eq. (6), to result in a metric referred to herein as an absolute-recursive-one metric, where Eq. (6) becomes:

$$\mu^n = \sum_{i=1}^{n} \mu_i = \sum_{i=1}^{n} |rw_i| \quad (7)$$

$$rw_i = dw_i + rw_{i-1}|_{dw=y-dz}$$

where $rw_0 = 0$.

Recursive-r Metric

Although Eq. (6) shows yet a simpler quasi-optimal implementation of the optimal metric in Eq. (5), care has to be taken to avoid excessive quantization/rounding noise in the fixed point signal processing prior to the partial response trellis decoder. The recursive-one metric implementation identified by equation (6) represents an integrator, and rounding noise may cause it to lose convergence. If metric convergence is a concern, some other sub-optimum metrics may be utilized which do not present this problem.

In another alternative embodiment, a family of recursive sub-optimum metrics is generated by replacing the fractional coefficients $(i-1/i)$ by constant fractional coefficients r. Although there will be a performance degradation, the fractional coefficient can be chosen to guarantee metric convergence for a particular implementation. With respect to the recursive-one metric, there is an added complexity of a multiplier followed by a shift register per state. The coefficient expression $(i-1)/i$ is calculated by the trellis decoder for each new symbol (sample). In the recursive-one metric discussed above, this coefficient is replaced by 1, which is the most basic constant. In the recursive-r metric, it is replaced by a constant coefficient r.

Of particular interest is the case when the fractional coefficient r is of the type p/q, where $p=q-1$, $q=2^m$ and $m>0$. Since q is a power of 2, it can be implemented with a shift register of m bits. The recursive $r=p/q$ metric is defined by:

$$\mu^n = \sum_{i=1}^{n} \mu_i = \sum_{i=1}^{n} (rw_i)^2 \quad (8)$$

$$rw_i = dw_i + (p*rw_{i-1}/q)|_{dw=y-dz}$$

where $rw_0 = 0$.

Thus the recursive-r metric is also a simplification of equation 5, where the term $(i-1)/i$ is replaced by a constant value $r=p/q$. This also results in a hardware simplification because it is constant, but since it is a fraction, it avoids possible convergence problems that the recursive-one metric might have. The recursive-r metric, although not optimum, can be as close as possible to the optimum and be guaranteed convergence.

Absolute Recursive-r Metric

An alternative embodiment of the recursive-r metric utilizes the concept of absolute metric, to derive an absolute-recursive-r metric, where Eq. (8) becomes:

$$\mu^n = \sum_{i=1}^{n} \mu_i = \sum_{i=1}^{n} |rw_i| \quad (9)$$

$$rw_i = dw_i + (p*rw_{i-1}/q)|_{dw=y-dz}$$

where $rw_0 = 0$.

Metric Performance

Recursive Metric

The performance of the recursive metric was evaluated by software simulation of the communication system. Curves of BER (Bit-Error-Rate) versus $E_b/N_0$ (bit energy-to-noise density ratio) were obtained for different values of $E_b/N_0$. The noise density in question is that of the AWGN noise, not the correlated noise at the output of the NTSC rejection filter 201. This allows us to compare the performance of both trellis decoders, i.e. 4-state (no NTSC interference) decoder 203 and 8-state trellis decoder 202 (with NTSC interference). The performance of 4-state decoder 203, employing the Euclidean metric in the non-NTSC interference case, is considered to be a benchmark for optimal performance.

Figure 6:
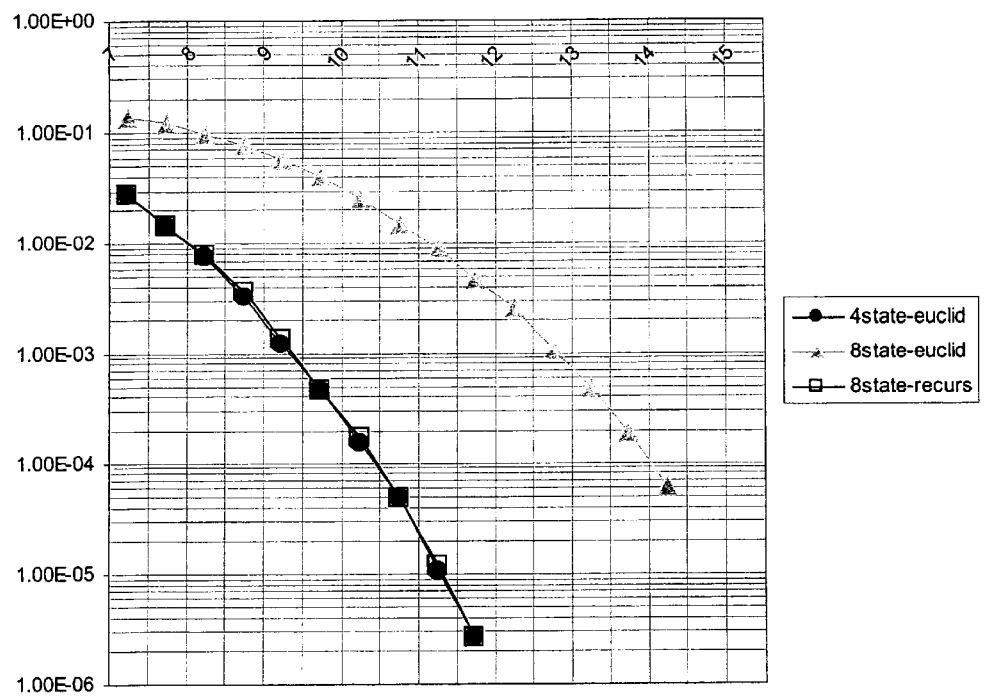
FIG. 6 is a graph plotting bit-error-rate (BER) vs. bit energy-to-noise density ratio ($E_b/N_0$) curves to illustrate the performance of a recursive trellis decoder metric of the present invention.

Referring now to FIG. 6, there is shown a graph 600 plotting BER vs. $E_b/N_0$ curves to illustrate the performance of the recursive trellis decoder metric of the present invention. In particular, graph 600 shows BER versus $E_b/N_0$ (dB) curves for the 4-state trellis decoder 203 (curve 603), and for the 8-state trellis decoder 202. Thus, the BER versus $E_b/N_0$ curve, which is illustrated for the 4-state trellis decoder 203 is the performance resulting from using the Euclidean metric (curve 603). The BER versus $E_b/N_0$ curves which are illustrated for the 8-state trellis decoder 202 are the performances resulting from using: the Euclidean metric (curve 602) and the recursive metric in accordance with the present invention in Eq. (5) (curve 601). These curves were obtained with floating point arithmetic for the metrics, pseudo-random binary input data, Viterbi decoding with path metric storage of 25 trellis branches and at least 1000 bit errors per point.

The results plotted in FIG. 6 lead to the following conclusions about decoder performance:

(1) The 8-state trellis decoder 202 (NTSC interference case) with the Euclidean metric (curve 602) has a performance degradation of 3.0 to 3.75 dB in the BER range of interest, with respect to the non-NTSC interference case. As explained above, this degradation is primarily due to the correlated noise after the NTSC rejection filter 201 having twice the variance of the AWGN noise in the non-NTSC interference path. This results in about 3.0 dB loss. Additional degradation comes from the fact that the noise is now correlated and the Euclidean metric does not take advantage of the correlation.

(2) The 8-state trellis decoder 202 with the recursive metric (curve 601) has no performance degradation with respect to the 4-state trellis decoder 203 (curve 603). Hence, the simulation results confirm that the recursive metric corresponds to the optimum metric.

Recursive-One Metric

Figure 7:
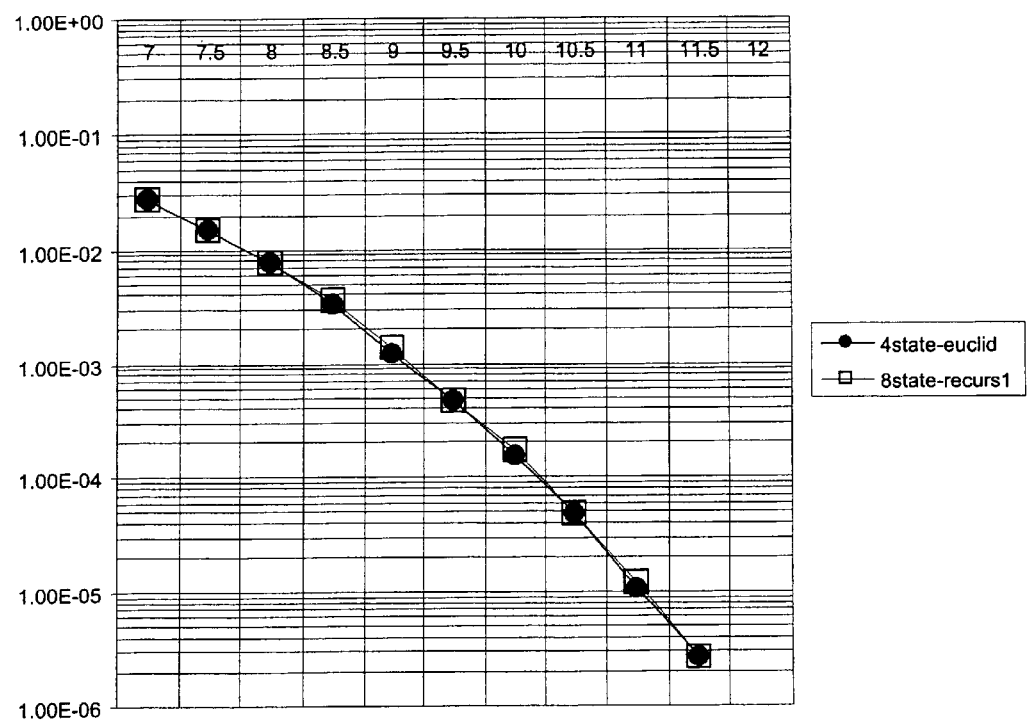
FIG. 7 is a graph plotting BER vs. $E_b/N_0$ curves to illustrate the performance of the recursive-one trellis decoder metric of the present invention.

Referring now to FIG. 7, there is shown a graph 700 plotting BER vs. $E_b/N_0$ curves to illustrate the performance of the recursive-one trellis decoder metric of the present invention (curve 701) and compared to the 4-state Euclidean metric trellis decoder (non-NTSC interference, curve 702). By observing the curves in FIG. 7, it is seen that the recursive-one metric does not degrade from the optimum metric, being of interest for a practical implementation.

Absolute Recursive-One Metric

Figure 8:
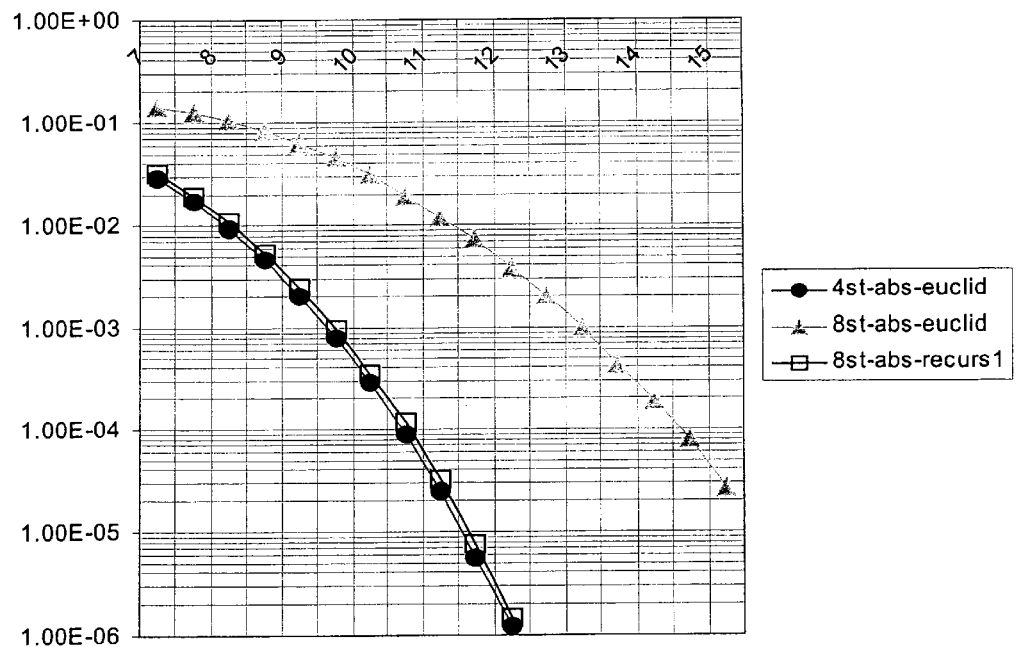
FIG. 8 is a graph plotting BER vs. $E_b/N_0$ curves to illustrate the performance of the absolute recursive-one trellis decoder metric of the present invention.

Referring now to FIG. 8, there is shown a graph 800 plotting BER vs. $E_b/N_0$ fixed-point curves to illustrate the performance of the absolute-recursive-one trellis decoder metric of the present invention (curve 801) and compared to the 4-state absolute-Euclidean metric trellis decoder (curve 803) and the 8-state absolute-Euclidean metric trellis decoder (curve 802). By observing the three curves in FIG. 8, we come to the following conclusions about the decoder performance:

(1) The 4-state trellis decoder with absolute-Euclidean metric (curve 803) has up to 0.25 dB degradation with respect to the Euclidean metric (curve 603), in the BER range of interest.

(2) The 8-state trellis decoder with absolute-Euclidean metric (curve 802) has up to 0.5 dB degradation with respect to the Euclidean metric (curve 602). It has a performance degradation of 3.0 to 4.0 dB with respect to the 4-state trellis and absolute-Euclidean metric (curve 803).

(3) The 8-state trellis decoder with absolute-recursive-one metric (curve 801) has up to 0.35 dB degradation with respect to the 4-state Euclidean metric (curve 603). Hence, it closely matches the performance of the 4-state trellis with absolute-Euclidean metric (curve 803).

Recursive-r Metric

Referring now to FIG. 9, there is shown a graph 900 plotting BER vs. $E_b/N_0$ fixed-point curves to illustrate the performance of the recursive-r trellis decoder metric of the present invention for several values of r (curves 901–903), and compared to the 4-state Euclidean metric trellis decoder (curve 905) and to the 8-state Euclidean metric trellis decoder (curve 904). By observing the curves in FIG. 9, we come to the following conclusions:

(1) The 8-state trellis decoder with recursive-½ metric (curve 901) has a performance improvement, of 1.5 dB over the 8-state trellis decoder with Euclidean metric (curve 904). This performance improvement corresponds to improvements in BER of more than 1 order of magnitude, for the same $E_b/N_0$. In addition, the recursive-½ metric has similar performance to the truncated metric of order 2, however, with a simpler implementation, since it only needs to store one metric term and needs one adder per trellis state.

(2) The 8-state trellis decoder with recursive-¾ metric (curve 902) has a performance improvement of 2.5 dB over the Euclidean metric (curve 904).

(3) The 8-state trellis decoder with recursive-⅞ metric (curve 903) has a performance improvement of 3.0 dB over the Euclidean metric (curve 904).

Absolute Recursive-r Metric

Referring now to FIG. 10, there is shown a graph 1000 plotting BER vs. $E_b/N_0$ fixed-point curves to illustrate the performance of the absolute-recursive-r trellis decoder metric of the present invention for several values of r(curves 1001–1003), and compared to the 4-state absolute-Euclidean metric trellis decoder (curve 1005) and to the 8-state absolute-Euclidean metric trellis decoder (curve 1004). By observing the curves in FIG. 10, we come to the following conclusions:

(1) The 8-state trellis decoder with absolute-recursive-½ metric (curve 1003) has up to 0.5 dB of degradation with respect to the recursive-½ metric (curve 901). It also has a performance improvement over the absolute-Euclidean metric (curve 1004) of 1.5 to 1.75 dB.

(2) The 8-state trellis decoder with absolute-recursive-¾ metric (curve 1002) has up to 0.75 dB of degradation with respect to the recursive-¾ metric (curve 902). It also has a performance improvement over the absolute-Euclidean metric (curve 1004) of 2.25 to 2.5 dB.

(3) The 8-state trellis decoder with absolute-recursive-⅞ metric (curve 1001) has up to 0.75 dB of degradation with respect to the recursive-⅞ metric (curve 903). It also has a performance improvement over the absolute-Euclidean metric (curve 1004) of 2.5 to 3.0 dB.

Accordingly, the family of recursive metrics of the present invention provide better performance than the Euclidean metric in the NTSC co-channel interference case of the ATSC-HDTV trellis decoder, resulting in suboptimal or optimal performance depending on the embodiment of the invention.

The recursive metric trellis decoding of the present invention may be advantageously employed in systems other than ATSC-HDTV systems, for example in any system in which a trellis-encoded digital data signal needs to be demodulated, and filtered for some purpose, where the signal, if not filtered, is optimally decoded by a trellis decoder employing an Euclidean metric, and where the use of the filter transforms white noise in the demodulated signal into correlated noise, such that trellis decoding the filtered signal with an Euclidean metric is no longer optimal. In such a system, a complex, non-Euclidean optimal metric is determined, and a recursive version of this non-Euclidean metric is employed when trellis decoding the filtered signal.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a system for receiving a signal containing digital data representing high definition television (HDTV) format information in the form of multilevel symbols formatted into groups of successive fields, each field comprising a field segment, a plurality of data segments, and associated sync components, a signal processing method comprising the steps of:

(a) demodulating the received signal to produce a demodulated signal;

(b) filtering the demodulated signal to reject NTSC co-channel interference to produce a filtered signal; and (c) trellis decoding the filtered signal with a trellis decoder employing a recursive non-Euclidean metric.

2. The method of claim 1, wherein the received signal is a Vestigial SideBand (VSB) modulated signal.

3. The method of claim 1, wherein the filtering step includes comb filtering the demodulated signal.

4. The method of claim 1, wherein:

step (a) comprises the step of demodulating the received signal with a demodulator;

step (b) comprises the steps of:
(1) detecting, with the demodulator, NTSC co-channel interference; and
(2) filtering the demodulated signal with a comb filter of the demodulator only if NTSC co-channel interference is detected by the demodulator; and step (c) comprises the step of trellis decoding the filtered signal with a partial response trellis decoder employing a recursive non-Euclidean metric if NTSC co-channel interference is detected by the demodulator and otherwise trellis decoding the demodulated signal with an optimal trellis decoder employing an Euclidean metric.

5. The method of claim 4, wherein the partial response trellis decoder is an 8-state partial response trellis decoder and the optimal non-NTSC interference trellis decoder is a 4-state optimal trellis decoder.

6. The method of claim 5, wherein the partial response trellis decoder and the optimal 4-state trellis decoder are implemented by a trellis decoder having 12 identical decoders for performing 12 decoder interleaving.

7. The method of claim 1, wherein an optimal metric to be used by the trellis decoder when there is NTSC interference and the filtering of step (b) is an optimal non-Euclidean metric associated with a product of conditional probability density functions of filtered noise samples, wherein the recursive metric is a recursive version of the optimal non-Euclidean metric.

8. The method of claim 1, wherein the recursive metric is given by the following formula:

$$\mu^n = \sum_{i=1}^{n} \mu_i = \sum_{i=1}^{n} (rw_i)^2$$

$$rw_i = dw_i + (i-1)rw_{i-1}/i \,|_{dw=y-dz}$$

where n is the sequence length; y is the received partial response symbol plus correlated noise; dz is the partial response symbol; dw is the correlated noise; $dw_{-m+1}= \ldots =dw_{-1}=dw_0\equiv 0$ and $rw_0=0$.

9. The method of claim 8, wherein the recursive metric includes a coefficient term (i−1)/i where i represents a sample, said coefficient term being replaced by a constant term of unity (1) to produce a recursive-one metric.

10. The method of claim 9, wherein the recursive-one metric is an absolute value recursive-one metric.

11. The method of claim 8, wherein the recursive metric includes a coefficient term (i−1)/i where i represents a sample, said coefficient term being replaced by a constant value fractional coefficient term r of the form p/q to produce a recursive-r metric, where p=q−1 and q is a power of 2.

12. The method of claim 11, wherein the recursive-r metric is an absolute value recursive-r metric.

13. In a system for receiving a trellis encoded signal containing digital data, a signal processing method comprising the steps of:

(a) demodulating the received signal to produce a demodulated signal having white noise, wherein the demodulated signal having white noise can be optimally trellis decoded by trellis decoding the signal employing an Euclidean metric;

(b) filtering the demodulated signal to produce a filtered signal, wherein the filtering transforms the white noise of the signal into correlated noise; and (c) trellis decoding the filtered signal with a trellis decoder employing a recursive non-Euclidean metric.

* * * * *